(12) United States Patent
Tomimoto

(10) Patent No.: US 7,110,200 B2
(45) Date of Patent: Sep. 19, 2006

(54) MAGNETIC DISK CONTROL APPARATUS, MAGNETIC DISK CONTROL METHOD, MAGNETIC DISK CONTROL PROGRAM, AND MAGNETIC DISK

(75) Inventor: Shin Tomimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 10/777,875

(22) Filed: Feb. 12, 2004

(65) Prior Publication Data
US 2005/0068652 A1    Mar. 31, 2005

(30) Foreign Application Priority Data
Sep. 25, 2003   (JP)   ............... 2003-332838

(51) Int. Cl.
*G11B 5/09* (2006.01)
(52) U.S. Cl. .......................... 360/48; 360/51
(58) Field of Classification Search ............... 360/48, 360/77.04, 51, 77.07
See application file for complete search history.

(56) References Cited
U.S. PATENT DOCUMENTS
5,844,920 A * 12/1998 Zook et al. ............... 714/769

5,903,404 A     5/1999  Tsurumi et al.
6,009,549 A *  12/1999  Bliss et al. .............. 714/769
2002/0118476 A1* 8/2002  Malone, Sr. ................ 360/48

* cited by examiner

*Primary Examiner*—David Hudspeth
*Assistant Examiner*—Varsha A. Kapadia
(74) *Attorney, Agent, or Firm*—Greer, Burns & Crain, Ltd

(57) ABSTRACT

A magnetic disk control apparatus is capable of reducing the overall length of synchronization fields in split sectors and hence capable of increasing the storage capacity for data fields. The apparatus records data for each sector in such a manner that when a servo field is present in a sector, the sector is split into a first split sector and a second split sector each including a synchronization field and a data field. The apparatus has a storage medium, a head, a mechanical section that controls the relative position of the storage medium and the head, a hard disk controller that controls write timing and read timing, and a read channel that modulates and writes a synchronization field and a data field according to the write timing, performs phase synchronization and frequency synchronization based on the synchronization field read according to the read timing, and demodulates the data field according to the obtained phase and frequency. The synchronization field of each second split sector has a length required only for phase synchronization.

4 Claims, 6 Drawing Sheets

(a) WG (b) Data (c) Write signal (a) RG (b) Split identification gate (c) Read signal Circumferential direction →

MAGNETIC DISK CONTROL APPARATUS, MAGNETIC DISK CONTROL METHOD, MAGNETIC DISK CONTROL PROGRAM, AND MAGNETIC DISK

BACKGROUND OF THE INVENTION

1. Field of the Invention

The present invention relates to a magnetic disk control apparatus, a magnetic disk control method and a magnetic disk control program for recording data for each sector on a magnetic disk in such a manner that when a servo field is present in a sector including a synchronization field and a data field, the sector is split into a first split sector and a second split sector each including a synchronization field and a data field. The present invention also relates to a magnetic disk for use with the magnetic disk control apparatus, method or program.

2. Description of the Related Art

First, the arrangement of a conventional magnetic disk apparatus will be described. As shown in FIG. 6, a magnetic disk apparatus 10 comprises a host interface 1, an HDC (Hard Disk Controller) 2, an RDC (Read Channel) 3, a preamplifier 4, a head 5, an SVC (Servo Combo) 6, a VCM (Voice Coil Motor) 7, a spindle motor 8, a storage medium 9.

Next, the operation of the magnetic disk apparatus will be outlined. The host interface 1 exchanges data with a host. The HDC 2 performs interface control, buffer management, data format management, etc. The RDC 3 modulates a write signal and demodulates a read signal. The preamplifier 4 amplifies a write signal or a read signal. The head 5 converts an electric signal into a magnetic field and writes it to the storage medium 9. Alternatively, the head 5 detects a magnetic field from the storage medium 9 and converts it into an electric signal to read it. The SVC 6 drives the VCM 7 and the spindle motor 8. The VCM 7 drives the head 5. The spindle motor 8 rotates the storage medium 9. The storage medium 9 retains a record signal from the head 5.

Next, the arrangement of tracks in the conventional magnetic disk apparatus will be described. FIG. 7 is a diagram showing an example of the track arrangement in the conventional magnetic disk apparatus. A magnetic disk is radially divided into tracks. Each track is circumferentially divided into sectors. In each track, servo fields are disposed at regular intervals. Accordingly, when the servo field interval is not coincident with an integral multiple of the sector length, a sector containing a servo field is split into two split sectors, i.e. one preceding the servo field, and the other that follows the servo field. In FIG. 7, reference numerals 1 and 2 denote split sectors. Reference numeral 3 denotes servo fields, and reference numeral 4 denotes ordinary sectors. The term "ordinary sectors" as used herein means sectors that are not split. The term "split sectors" means sectors split by a servo field.

FIG. 8 is a diagram showing an example of the arrangement of ordinary sectors. As shown in FIG. 8, an ordinary sector has a synchronization field disposed at the head thereof, and a data field is disposed in the remaining area of the sector. The synchronization field has a single pattern written therein for phase synchronization and phase frequency synchronization.

FIG. 9 is a diagram showing an example of the arrangement of split sectors. Let us assume herein that the first of the two split data area segments is a first split sector 1 and the second of them is a second split sector 2. As shown in FIG. 9, in the first split sector 1, a synchronization field is disposed at the head thereof, and a data field is disposed in the remaining area of the first split sector 1. Similarly, in the second split sector 2, a synchronization field is disposed at the head thereof, and a data field is disposed in the remaining area of the second split sector 2.

The following is a description of data write and read operations performed by the HDC 2 and the RDC 3. FIG. 10 is a block diagram showing an example of the HDC and RDC arrangement in the conventional apparatus. As shown in FIG. 10, the HDC 2 comprises a sector format control section 21, a data control section 22, a WG (Write Gate) control section 23, and an RG (Read Gate) control section 24. The RDC 3 comprises a modulation section 31, a synchronization field generating section 32, a demodulation section 33, and a synchronization section 34.

The modulation section 31 modulates a synchronization field pattern input from the synchronization field generating section 32 and a data field pattern input from the data control section 22 and outputs the modulated patterns as a write signal to the preamplifier 4. The synchronization section 34 performs phase synchronization and frequency synchronization by using the synchronization field of a read signal from the preamplifier 4 and outputs the obtained synchronous phase and synchronous frequency to the demodulation section 33. The demodulation section 33 demodulates the data field of the read signal from the preamplifier 4 according to the synchronous phase and the synchronous frequency and outputs the demodulated data to the data control section 22.

First of all, the operation for writing data will be described. First, the sector format control section 21 controls the format of sectors. Upon receipt of a write instruction from the host through the host interface 1, the sector format control section 21 determines a head position with respect to the storage medium 9 and a write timing according to the format and outputs the head position to the SVC 6 and the write timing to the WG control section 23. As shown in (a) of FIG. 11, the WG control section 23 turns ON a write gate (WG) to be output to the modulation section 31 for a period of time corresponding to the period of the write sector from the write timing.

After a predetermined time has elapsed, the sector format control section 21 outputs a data write instruction to the data control section 22. The term "predetermined time" as used herein means a period of time for writing a synchronization field. As shown in (b) of FIG. 11, the data control section 22 outputs write data input from the host interface 1 according to the instruction from the sector format control section 21.

The synchronization field generating section 32 generates a single pattern to be written in the synchronization field. As shown in (c) of FIG. 11, when WG=ON, the modulation section 31 modulates the single pattern from the synchronization field generating section 32 and outputs the modulated pattern to the preamplifier 4. Next, when the write data from the data control section 22 is input thereto, the modulation section 31 modulates the write data and outputs the modulated write data to the preamplifier 4.

The WG control section 23 turns OFF the WG when the position for writing data reaches the servo field (trailing end of the data field), as shown in (a) of FIG. 11, and outputs the WG=OFF signal to the modulation section 31. The modulation section 31 stops the write operation at the timing of WG=OFF, as shown in (c) of FIG. 11.

Next, the operation for reading data will be described. Upon receipt of a read instruction from the host through the host interface 1, the sector format control section 21 determines a head position above the storage medium 9 and a read timing and outputs the head position to the SVC 6 and the read timing to the RG control section 24. As shown in (a) of FIG. 12, the RG control section 24 turns ON a read gate (RG) to be output to the demodulation section 33 and the synchronization section 34 for a period of time corresponding to the period of the read sector from the read timing.

The synchronization section 34 performs phase synchronization and phase frequency synchronization by using the synchronization field at the timing of RG=ON, as shown in (b) of FIG. 12, and outputs the obtained synchronous frequency and synchronous phase to the demodulation section 33. The demodulation section 33 demodulates read data according to the synchronous frequency and the synchronous phase and outputs the read data thus obtained to the data control section 22. The data control section 22 outputs the read data to the host interface 1.

The RG control section 24 turns OFF the RG when the read position reaches the servo field, as shown in (a) of FIG. 12, and outputs the RG=OFF signal to the demodulation section 33. The demodulation section 33 stops the read operation at the timing of RG=OFF, as shown in (b) of FIG. 12. In this way, the data write and read operations are performed by the HDC 2 and the RDC 3.

The above-described conventional magnetic disk apparatus suffers, however, from the following disadvantage. When data is written, synchronization fields of the same length are constantly provided for sectors irrespective of whether they are ordinary sectors or split sectors. Therefore, each sector split into first and second split sectors requires a synchronization field double in size that of an ordinary sector, resulting in a reduction in the overall storage capacity for data fields on the disk.

SUMMARY OF THE INVENTION

The present invention was made in view of the above-described problems with the related art.

Accordingly, an object of the present invention is to provide a magnetic disk control apparatus, a magnetic disk control method and a magnetic disk control program that are capable of reducing the overall length of synchronization fields in split sectors and hence capable of increasing the storage capacity for data fields.

To solve the above-mentioned problems, according to a first aspect of the present invention, there is provided a magnetic disk control apparatus for recording data for each sector on a magnetic disk in such a manner that when a servo field is present in a sector including a synchronization field and a data field, the sector is split into a first split sector and a second split sector each including a synchronization field and a data field.

The apparatus includes: a first synchronization field forming section that forms the synchronization field in the first split sector; a second synchronization field forming section that forms the synchronization field shorter than that of the first split sector in the second split sector.

In a preferred form of the first aspect of the present invention, the first synchronization field forming section forms a phase synchronization field capable of phase synchronization and a phase frequency synchronization field capable of phase frequency synchronization as the synchronization field, and the second synchronization field forming section forms a phase synchronization field capable of phase synchronization as the synchronization field.

In another preferred form of the first aspect of the present invention, the apparatus further includes: a phase frequency information storage section that reads and stores, when data recorded on the magnetic disk is read, phase frequency information from the phase frequency synchronization field formed by the first synchronization field forming section and uses the phase frequency information as phase frequency synchronization information for reading data from the second split sector.

According to a second aspect of the present invention, there is provided a magnetic disk control method for recording data for each sector on a magnetic disk in such a manner that when a servo field is present in a sector including a synchronization field and a data field, the sector is split into a first split sector and a second split sector each including a synchronization field and a data field.

The method includes, for recording data on the magnetic disk: a first split sector forming step of forming a data field after forming the synchronization field as the first split sector; and a second split sector forming step of forming a data field after forming the synchronization field shorter than that of the first split sector as the second split sector.

In a preferred form of the second aspect of the present invention, in the first split sector forming step, the data field is formed after a phase synchronization field capable of phase synchronization and a phase frequency synchronization field capable of phase frequency synchronization are formed as the synchronization field, in the second split sector forming step, the data field is formed after a phase synchronization field capable of phase synchronization is formed as the synchronization field.

In another preferred form of the second aspect of the present invention, the method further includes, for reading data from the magnetic disk: a first split sector reading step of reading phase information from the phase synchronization field in the first split sector and phase frequency information from the phase frequency synchronization field in the first split sector and reading data from the data field in the first split sector; and a second split sector reading step of reading phase information from the phase synchronization field in the second split sector and reading data from the data field in the second split sector by using the phase information read from the phase synchronization field in the second split sector and the phase frequency information read from the phase frequency synchronization field in the first split sector.

According to a third aspect of the present invention, there is provided a magnetic disk control program for instructing a computer to execute a magnetic disk control method for recording data for each sector on a magnetic disk in such a manner that when a servo field is present in a sector including a synchronization field and a data field, the sector is split into a first split sector and a second split sector each including a synchronization field and a data field.

The program instructs the computer to execute, when recording data on the magnetic disk: a first split sector forming step of forming a data field after forming the synchronization field as the first split sector; and a second split sector forming step of forming a data field after forming the synchronization field shorter than that of the first split sector as the second split sector.

In a preferred form of the third aspect of the present invention, in the first split sector forming step, the data field is formed after a phase synchronization field capable of phase synchronization and a phase frequency synchronization field capable of phase frequency synchronization are formed, in the second split sector forming step, the data field is formed after a phase synchronization field capable of phase synchronization is formed.

In another preferred form of the third aspect of the present invention, the program further instructs the computer to execute, when reading data from the magnetic disk: a first split sector reading step of reading phase information from the phase synchronization field in the first split sector and phase frequency information from the phase frequency synchronization field in the first split sector and reading data from the data field in the first split sector; and a second split sector reading step of reading phase information from the phase synchronization field in the second split sector and reading data from the data field in the second split sector by using the phase information read from the phase synchronization field in the second split sector and the phase frequency information read from the phase frequency synchronization field in the first split sector.

According to a fourth aspect of the present invention, there is provided a magnetic disk having data for each sector recorded thereon in such a manner that when a servo field is present in a sector including a synchronization field and a data field, the sector is split into a first split sector and a second split sector each including a synchronization field and a data field.

In the first split sector, the synchronization field is formed, and a data field is formed following the synchronization field.

In the second split sector, the synchronization field shorter than that of in the first split sector is formed, and a data field is formed following the synchronization field.

In a preferred form of the fourth aspect of the present invention, in the first split sector, a phase synchronization field capable of phase synchronization and a phase frequency synchronization field capable of phase frequency synchronization are formed as the synchronization field, and a data field is formed following the phase frequency synchronization field.

In the second split sector, a phase synchronization field is formed as the synchronization field, and a data field is formed following the phase synchronization field.

The above-described arrangement allows the recording density to be reduced by reducing the overall length of synchronization fields in the split sectors. Accordingly, data write errors can be reduced by writing data extendedly in data fields that are allowed to lengthen correspondingly. It should be noted that in embodiments of the present invention the first and second synchronization field forming sections comprise a sector format control section 101, a WG control section 23, a data control section 22, a modulation section 31, and a synchronization field generating section 32.

It should be noted that the above-described magnetic disk control program may be stored in mediums readable by a computer. In the present invention, computer-readable mediums include semiconductor memories, e.g. ROMs and RAMs, portable storage mediums, e.g. CD-ROMs, flexible disks, DVD disks, optical magnetic disks, and IC cards, databases retaining computer programs, other computers, databases thereof, and transmission mediums on communication lines.

As has been detailed above, the present invention makes it possible to reduce the length of the synchronization field in each split sector and to increase the storage capacity for data fields. Accordingly, the recording density can be reduced, for example, by reducing the overall length of synchronization fields in the split sectors, and data write errors can be reduced by writing data extendedly in data fields that are allowed to lengthen correspondingly.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

Embodiments of the present invention will be described below with reference to the accompanying drawings.

Figure 1:
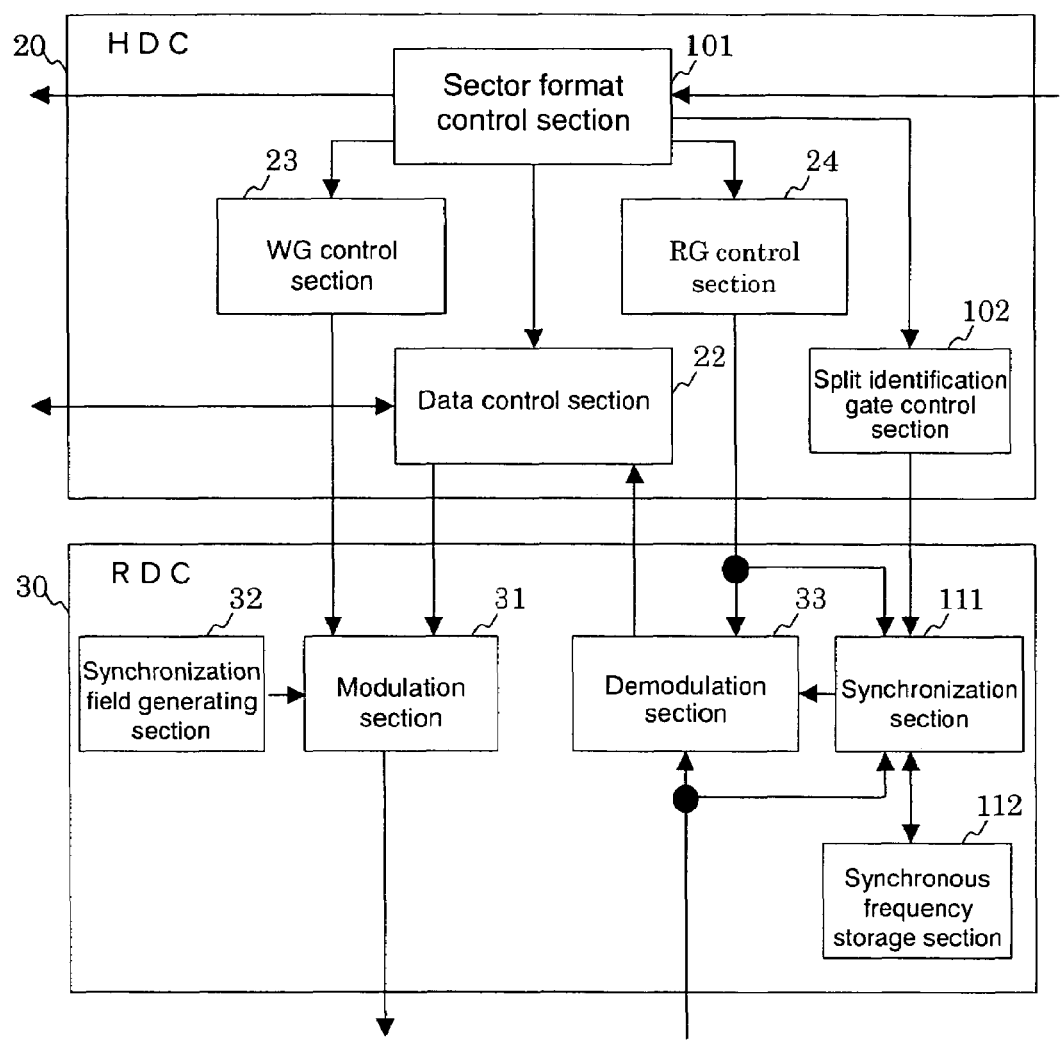
FIG. 1 is a block diagram showing an example of the arrangement of an HDC and RDC in an embodiment of the present invention.
Figure 6:
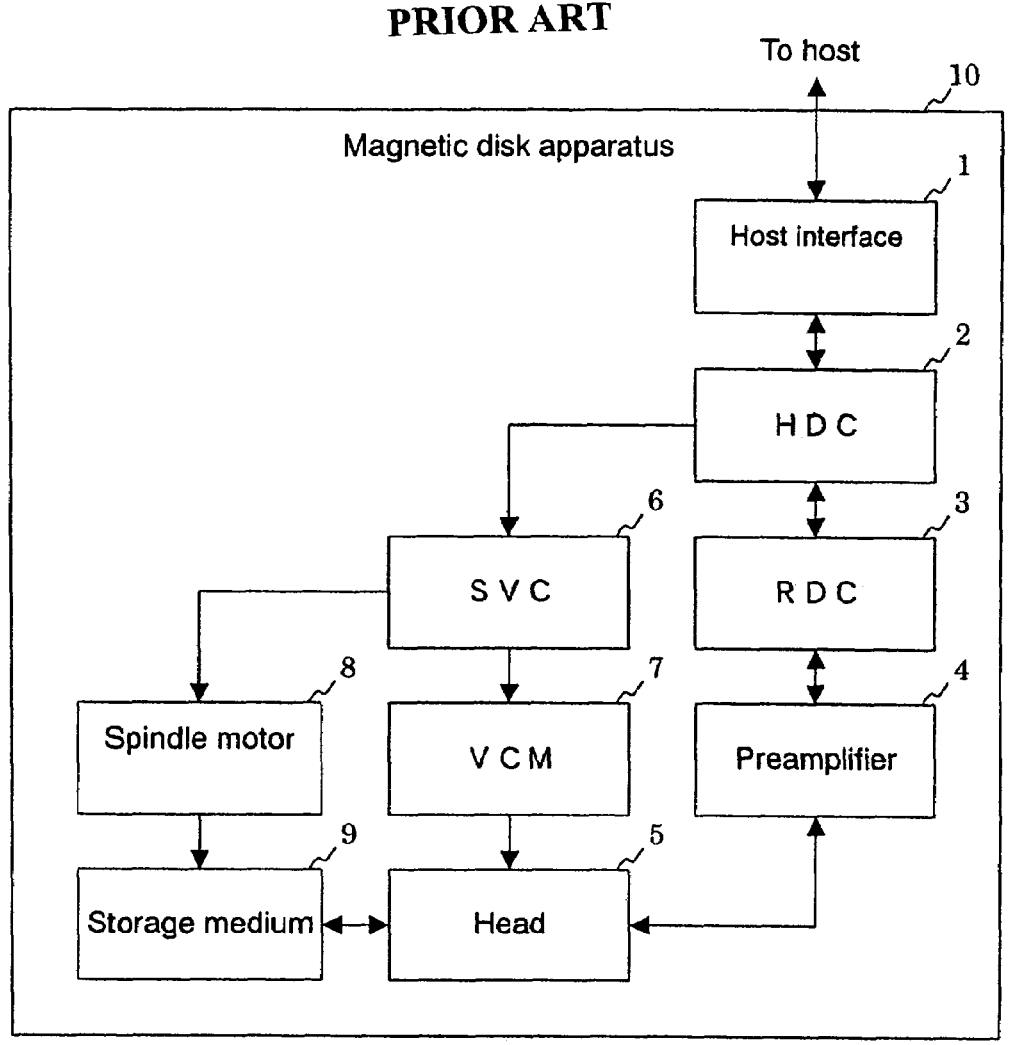
FIG. 6 is a block diagram showing an example of the arrangement of a conventional magnetic disk apparatus.
Figure 7:
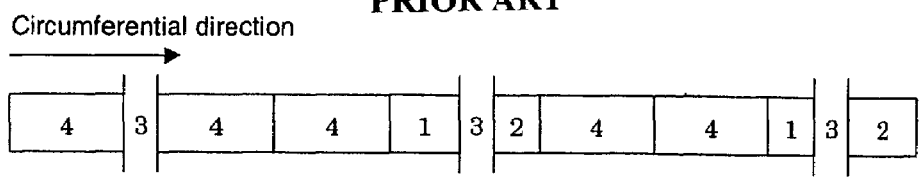
FIG. 7 is a diagram showing an example of the arrangement of a track in the conventional magnetic disk apparatus.
Figure 8:
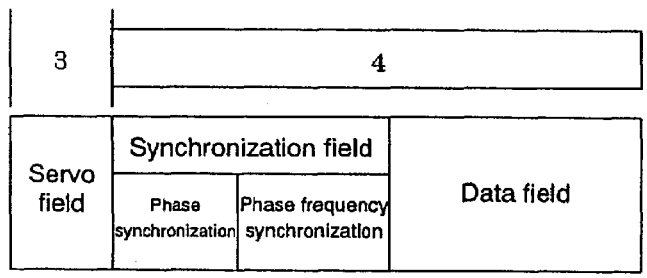
FIG. 8 is a diagram showing an example of the arrangement of an ordinary sector.
Figure 9:
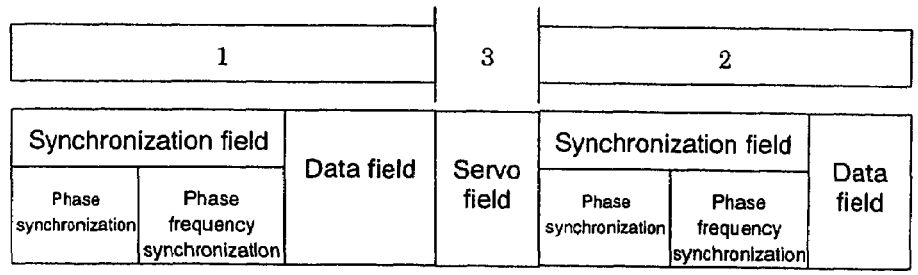
FIG. 9 is a diagram showing an example of the arrangement of split sectors.
Figure 10:
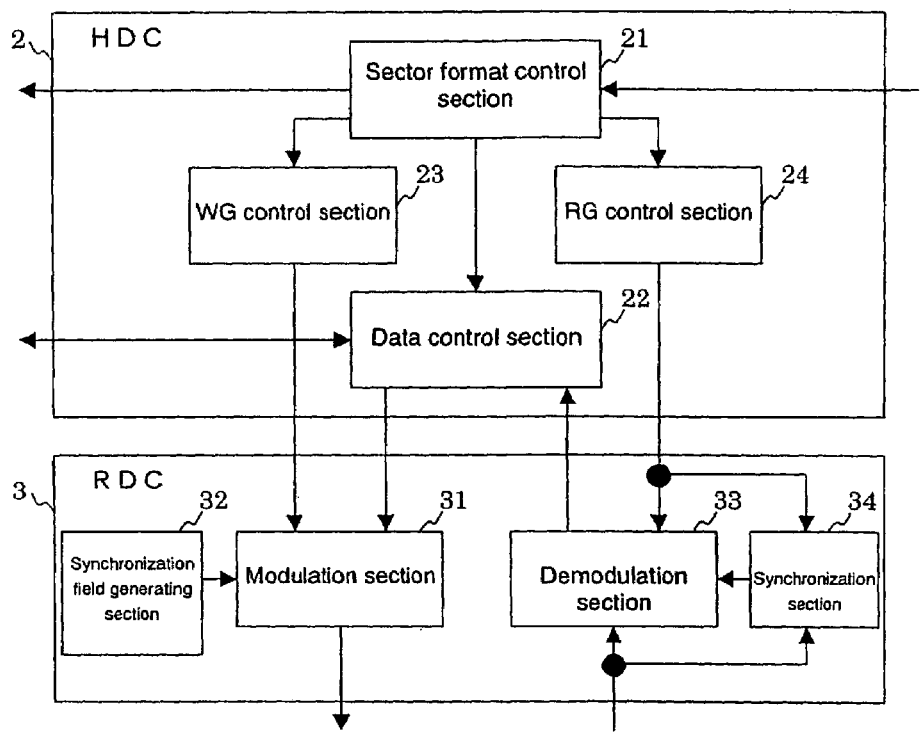
FIG. 10 is a block diagram showing an example of the arrangement of an HDC and RDC in the conventional magnetic disk apparatus.

FIG. 1 is a block diagram showing an example of the arrangement of an HDC and RDC in an embodiment of the present invention. In FIG. 1, blocks denoted by the same reference signs as those in FIG. 10 are similar to the blocks shown in FIG. 10. Therefore, a description thereof is omitted herein. The magnetic disk apparatus according to the present invention, which corresponds to FIG. 6, has an HDC 20 in place of the HDC 2 and an RDC 30 in place of the RDC 3. In this embodiment, the HDC 20 has a sector format control section 101 in place of the sector format control section 21 and is additionally provided with a split identification gate control section 102. The RDC 30 has a synchronization section 111 in place of the synchronization section 34 and is additionally provided with a synchronous frequency storage section 112.

The HDC 20 and the RDC 30 in this embodiment perform write and read operations for ordinary sectors and first split sectors in the same way as in the case of the HDC 2 and the RDC 3 in the conventional magnetic disk apparatus. For second split sectors, however, the HDC 20 and the RDC 30 perform write and read operations different from those in the conventional magnetic disk apparatus. Data write and read operations in magnetic disk apparatus are performed for each sector, and there is almost no frequency variation between each pair of split sectors. Therefore, in this embodiment, the synchronization field in each second split sector comprises only a phase synchronization field for performing phase synchronization, which is formed from a single short pattern. Thus, formation of a phase frequency synchronization field for performing phase frequency synchronization in each second split sector as provided in the conventional arrangement is omitted. Data write and read operations for second split sectors will be described below in detail.

First, the operation for writing data will be described. During data writing, when a sector to be written is a second split sector, the sector format control section 101 instructs the WG control section 23 to output a write gate (WG). As shown in (a) of FIG. 2, the WG control section 23 turns ON the WG to be output to the modulation section 31 for a period of time corresponding to the period of the write sector.

After a predetermined time has elapsed, the sector format control section 101 outputs a data write instruction to the data control section 22. The term "predetermined time" as used herein means a period of time required to write a synchronization field for performing only phase synchronization. As shown in (b) of FIG. 2, the data control section 22 outputs write data input from the host interface 1 according to the instruction from the sector format control section 101.

Figure 3:
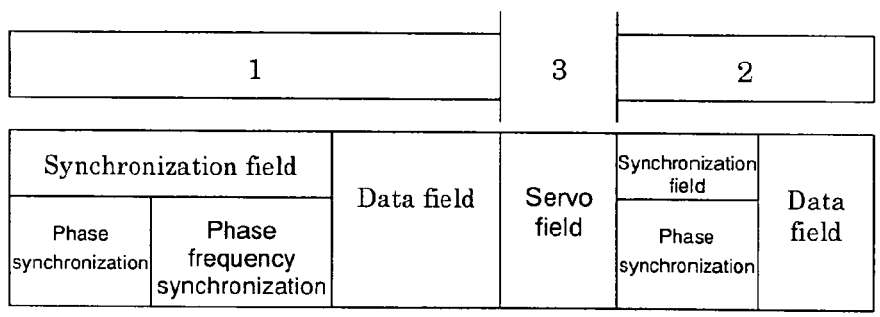
FIG. 3 is a diagram showing an example of the arrangement of a split sector in the embodiment of the present invention.

FIG. 3 is a diagram showing an example of the arrangement of split sectors in this embodiment. Let us assume herein that the first of two split data area segments is a first split sector 1, and the second is a second split sector 2. As shown in FIG. 3, the synchronization field in the first split sector 1 comprises a synchronization field written with a single pattern for phase synchronization and phase frequency synchronization in the same way as in the conventional arrangement. However, the synchronization field in the second split sector 2 comprises a synchronization field written only with a single pattern for phase synchronization.

Figure 2:
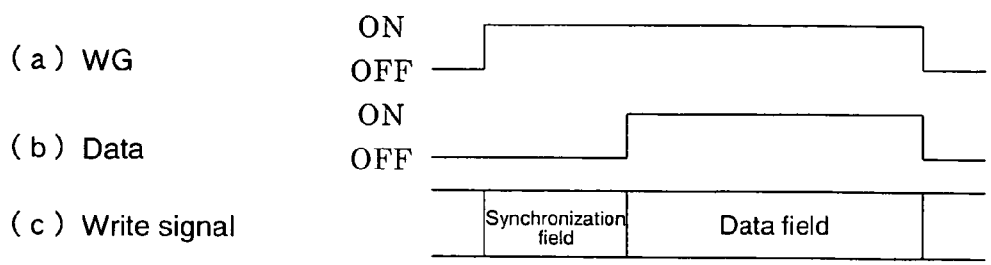
FIG. 2 is a diagram showing an example of a time chart of a data write operation in the embodiment of the present invention.
Figure 11:
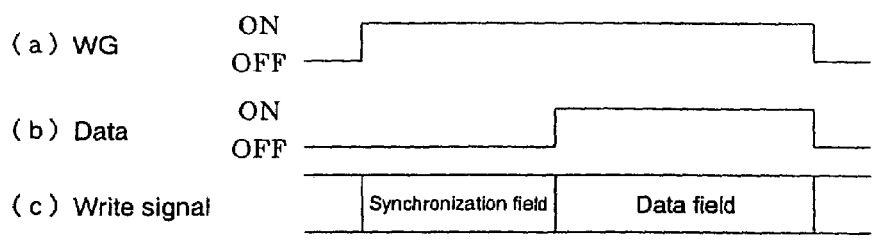
FIG. 11 is a diagram showing an example of a time chart of a data write operation of the conventional magnetic disk apparatus.
Figure 12:
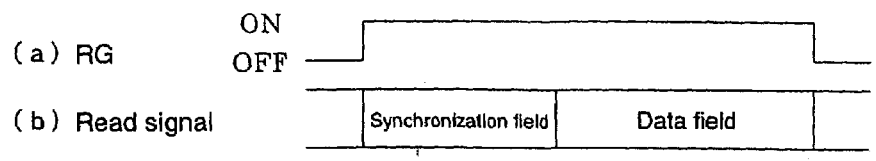
FIG. 12 is a diagram showing an example of a time chart of a data read operation of the conventional magnetic disk apparatus.

Thus, the length of the synchronization field of the second split sector in this embodiment is shortened as shown in (c) of FIG. 2 in comparison to the synchronization field of the second split sector in the conventional arrangement, which is shown in (c) of FIG. 11.

Figure 4:
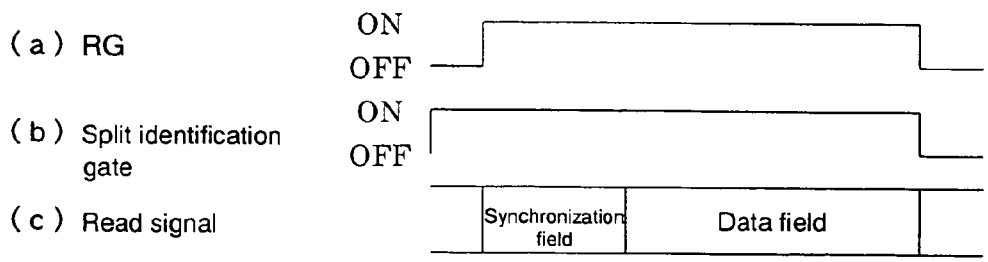
FIG. 4 is a diagram showing an example of a time chart of a data read operation in the embodiment of the present invention.

Next, the operation for reading data will be described. During data reading, when a sector to be read is a second split sector, the sector format control section 101 instructs the split identification gate control section 102 that the read sector is a second split sector. The split identification gate control section 102 turns ON a split identification gate to be output to the synchronization section 111 from a time immediately before the second split sector until the termination of the period of the second split sector, as shown in (b) of FIG. 4.

Next, the sector format control section 101 outputs a read timing signal to the RG control section 24. As shown in (a) of FIG. 4, the RG control section 24 turns ON a read gate (RG) to be output to the demodulation section 33 and the synchronization section 111 for a period of time corresponding to the period of the read sector.

Figure 5:
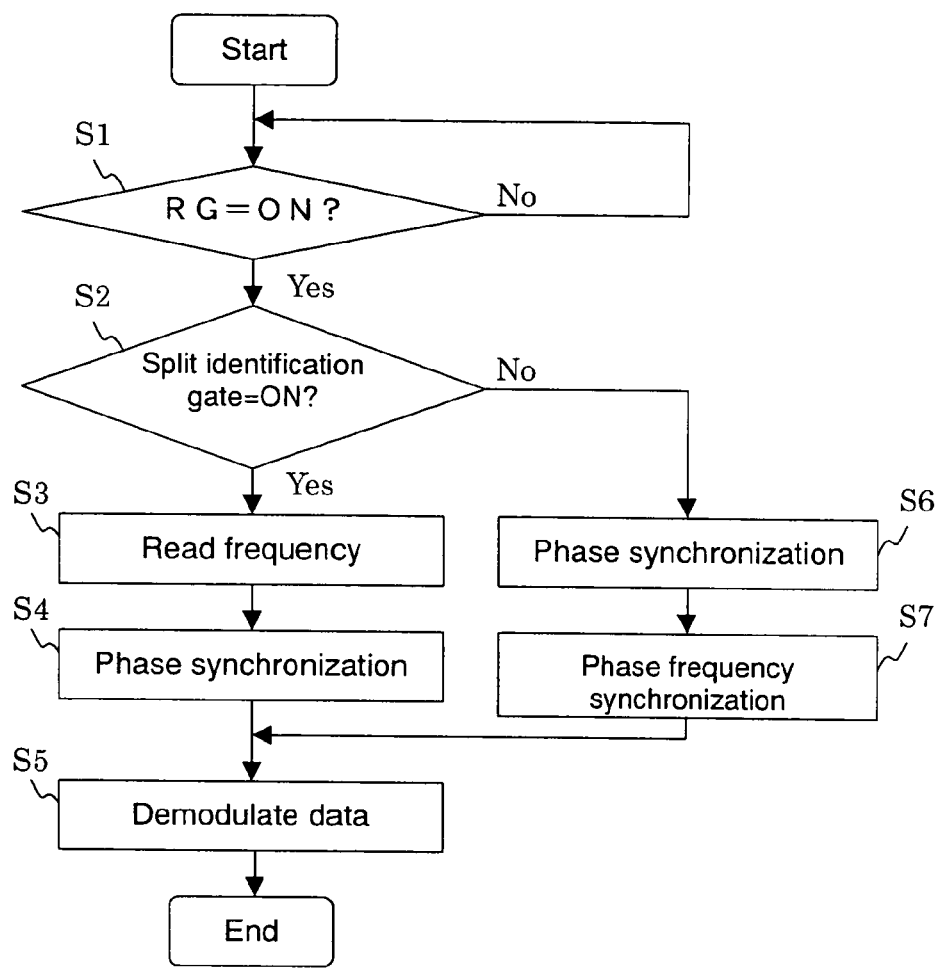
FIG. 5 is a flowchart showing the operation of a synchronization section and a demodulation section at the time of reading data in the embodiment of the present invention.

FIG. 5 is a flowchart showing the operation of the synchronization section 111 and the demodulation section 33 at the time of reading data in this embodiment. When RG=OFF (if "No" at step S1), the synchronization section 111 returns to processing S1. If RG=ON (if "Yes" at step S1), the synchronization section 111 judges whether the split identification G (gate) is ON or OFF at step S2.

If the split identification G=OFF (if "No" at step S2), the synchronization section 111 performs phase synchronization (step S6) first and then performs phase frequency synchronization (step S7) by using the synchronization field. At this time, the synchronization section 111 stores a synchronous frequency obtained by the phase frequency synchronization into the synchronous frequency storage section 112. If the split identification G=ON (if "Yes" at step S2), the synchronization section 111 reads the synchronous frequency from the synchronous frequency storage section 112 (step S3) and performs phase synchronization by using the read synchronous frequency (step S4), as shown in (c) of FIG. 4. Then, the synchronization section 111 outputs the obtained synchronous frequency and synchronous phase to the demodulation section 33. The demodulation section 33 demodulates data according to the synchronous frequency and the synchronous phase (step S5). Thus, the flow is terminated. In this way, the overall length of synchronization fields in the split sectors can be shortened in comparison to that in the conventional arrangement.

The embodiment of the present invention enables a loss of about 20 bytes due to synchronization fields to be reduced to about 5 bytes. Usually, the number of split sectors is about ¼ of the total number of sectors. Therefore, the recording density can be reduced by about 1%. Accordingly, data write errors can be reduced by writing data extendedly in data fields that are allowed to lengthen correspondingly.

It should be noted that the present invention is not necessarily limited to the foregoing embodiments but can be modified in a variety of ways without departing from the gist of the present invention.

What is claimed is:

1. A magnetic disk control apparatus for recording data for each sector on a magnetic disk in such a manner that when a servo field is present in a sector including a synchronization field and a data field, said sector is split into a first split sector and a second split sector each including a synchronization field and a data field, said apparatus comprising:

a first synchronization field forming section that forms said synchronization field in said first split sector; and a second synchronization field forming section that forms said synchronization field shorter than that of said first split sector in said second split sector, wherein said first synchronization field forming section forms a phase synchronization field capable of phase synchronization and a phase frequency synchronization field capable of phase frequency synchronization as said synchronization field, and said second synchronization field forming section forms a phase synchronization field capable of phase synchronization as said synchronization field;

said apparatus further comprising:

a phase frequency information storage section that reads and stores, when data recorded on the magnetic disk is read, phase frequency information from the phase frequency synchronization field formed by said first synchronization field forming section so as to use the phase frequency information as phase frequency synchronization information for reading data from said second split sector.

2. A magnetic disk control method for recording data for each sector on a magnetic disk in such a manner that when a servo field is present in a sector including a synchronization field and a data field, said sector is split into a first split sector and a second split sector each including a synchronization field and a data field, said method comprising, for recording data on the magnetic disk;
a first split sector forming step of forming a data field after forming said synchronization field as said first split sector; and
a second split sector forming step of forming a data field after forming said synchronization field shorter than that of said first split sector as said second split sector,
wherein, in said first split sector forming step, said data field is formed after a phase synchronization field capable of phase synchronization and a phase frequency synchronization field capable of phase frequency synchronization are formed as said synchronization field, wherein, in said second split sector forming step, said data field is formed after a phase synchronization field capable of phase synchronization is formed as said synchronization field,
said method further comprising, for reading data from the magnetic disk:
a first split sector reading step of reading phase information from the phase synchronization field in said first split sector and phase frequency information from the phase frequency synchronization field in said first split sector and reading data from the data field in said first split sector; and
a second split sector reading step of reading phase information from the phase synchronization field in the second split sector and reading data from the data field in the second split sector by using the phase information read from the phase synchronization field in said second split sector and the phase frequency information read from the phase frequency synchronization field in said first split sector.

3. A magnetic disk control program for instructing a computer to execute a magnetic disk control method for recording data for each sector on a magnetic disk in such a manner that when a servo field is present in a sector including a synchronization field and a data field, said sector is split into a first split sector and a second split sector each including a synchronization field and a data field,
said program instructing the computer to execute, when recording data on the magnetic disk:
a first split sector forming step of forming a data field after forming said synchronization field as said first split sector; and
a second split sector forming step of forming a data field after forming said synchronization field shorter than that of said first split sector as said second split sector,
wherein, in said first split sector forming step, said data field is formed after a phase synchronization field capable of phase synchronization and a phase frequency synchronization field capable of phase frequency synchronization are formed,
wherein, in said second split sector forming step, said data field is formed after a phase synchronization field capable of phase synchronization is formed;
said program further instructing the computer to execute, when reading data from the magnetic disk:
a first split sector reading step of reading phase information from the phase synchronization field in said first split sector and phase frequency information from the phase frequency synchronization field in said first split sector and reading data from the data field in said first split sector; and
a second split sector reading step of reading phase information from the phase synchronization field in said second split sector and reading data from the data field in said second split sector by using the phase information read from the phase synchronization field in said second split sector and the phase frequency information read from the phase frequency synchronization field in said first split sector.

4. A magnetic disk having data for each sector recorded thereon in such a manner that when a servo field is present in a sector including a synchronization field and a data field, said sector is split into a first split sector and a second split sector each including a synchronization field and a data field,
wherein, in said first split sector, said synchronization field is formed, and a data field is formed following said synchronization field,
wherein, in said second split sector, said synchronization field shorter than that of in said first split sector is formed, and a data field is formed following said synchronization field,
wherein, in said first split sector, a phase synchronization field for a phase synchronization information and a phase frequency synchronization field for a phase frequency synchronization information are formed as said synchronization field, and a data field is formed following said phase frequency synchronization field,
wherein, in said second split sector, a phase synchronization field is formed as said synchronization field, and a data field is formed following said phase synchronization field,
wherein said phase frequency synchronization information in said phase frequency synchronization field can be used as a phase frequency synchronization information for reading data from the second split sector.

* * * * *